United States Patent Office 3,407,666
Patented Oct. 29, 1968

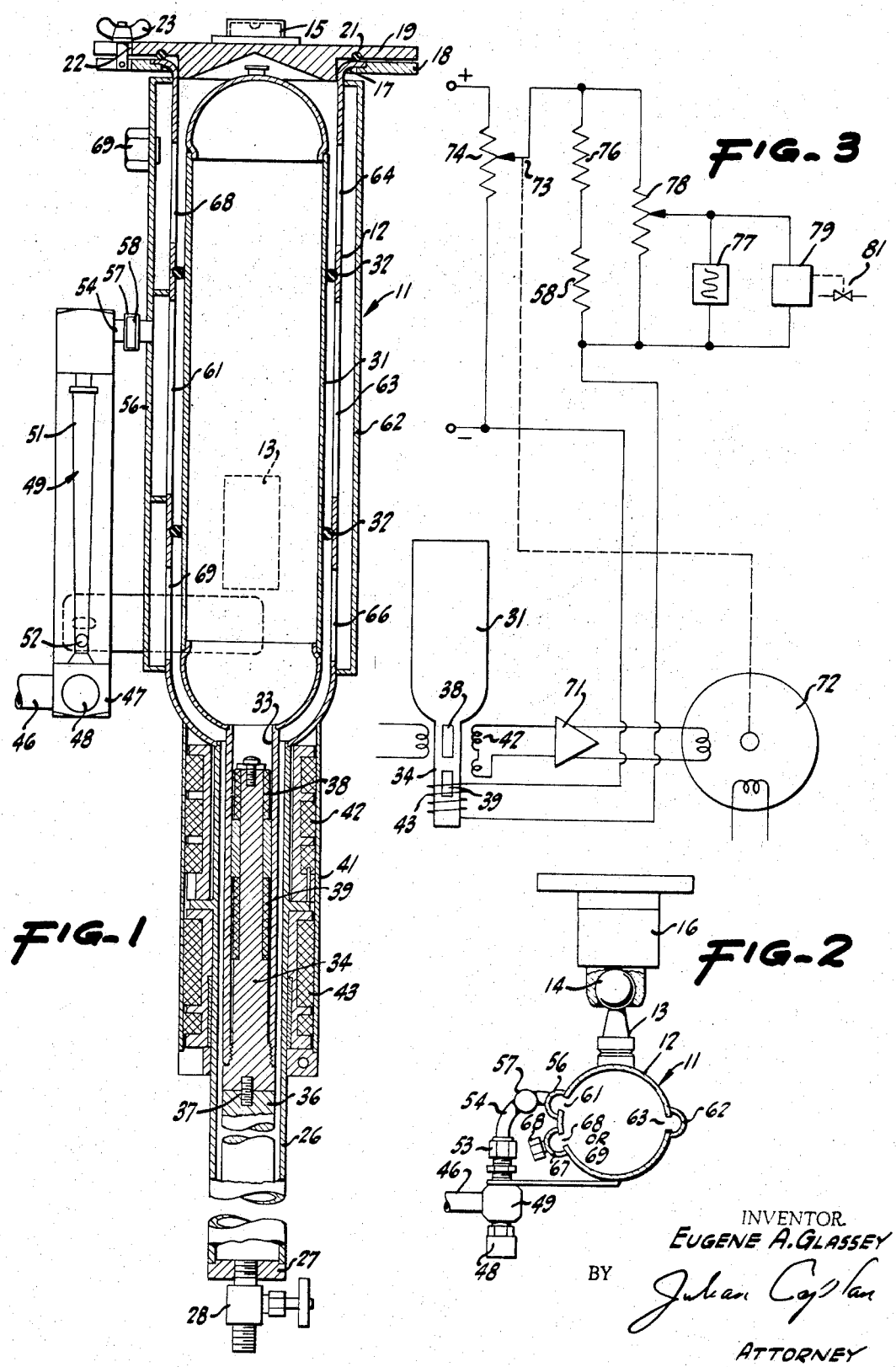

3,407,666
SUBMERGED DENSITY SENSING INSTRUMENT
Eugene A. Glassey, Los Altos, Calif., assignor to Exactel Instrument Company, Mountain View, Calif.
Continuation-in-part of application Ser. No. 471,136, July 12, 1965. This application May 31, 1966, Ser. No. 559,651
10 Claims. (Cl. 73—452)

ABSTRACT OF THE DISCLOSURE

A densitometer continuously samples and discharges liquid flowing through a conduit to record and, if desired, control density. A closed casing contains a continuously submerged bulb to which an armature of a differential transformer is attached. The transformer controls flow of current through a coil which attracts another armature attached to the bulb. The current through the coil required to maintain the first armature centered in the transformer indicates density.

---

This invention is a continuation-in-part of application Ser. No. 471,136, filed July 12, 1965, for "Closed Circuit Density Control Instrument," and relates more particularly to a submerged hydrometer-type density sensing instrument of improved characteristics.

The invention relates to an instrument which continuously samples and discharges liquid flowing through a conduit to record the density of the liquid and/or to make certain adjustments in the components making up the liquid so as to control density (i.e., specific gravity). Essentially, the instrument provides a chamber in which is a submerged hydrometer. The armature of a differential transformer moves with the hydrometer and controls a servomotor which adjusts the current through an electromagnetic coil controlling the position of a magnetic armature which is also movable with the hydrometer. By measuring the amount of current necessary to maintain the differential transformer armature centered in its coil, a record of the density is obtained and further a controller may be actuated by said current to control the opening of a valve which regulates flow of one of several components into the line being sampled to maintain a predetermined density.

A chief advantage is that the liquid processed does not come in contact with the atmosphere, thus may be processed to meet most sanitary codes and may be of any temperature and pressure over wide limits, as compatible with heavy metal (e.g., stainless steel) construction. Also a high degree of chemical activity may be tolerated.

A further advantage of this invention is the simplicity of the construction of the instrument and its sensitivity to variations in density.

A still further advantage of the invention is the fact that although the fluid flowing through the conduit is continuously sampled, nevertheless the sampling is not by batch method but, on the contrary, instantaneous variations in density through the main conduit affect the control and recording functions of the instrument.

A still further feature of the invention is the fact that variations in rate of flow and pulsations in flow are damped so that the position of the delicate hydrometer bulb is not affected thereby. More particularly, in accordance with the present invention there is a horizontal flow of liquid past the hydrometer bulb and there is little if any vertical force imposed upon the hydrometer bulb by the liquid flow. At least theoretically, and to a considerable extent practically, there are no net vertical forces applied to the bulb.

Still another feature of the invention is the provision of means of compensation for variations in temperature of the fluid which affect density readings. More particularly, provision is made in the electrical circuit of the instrument for electrical compensation of temperature variation.

Other objects of the present invention will become apparent upon reading the following specification and referring to the accompanying drawings in which similar characters of reference represent corresponding parts in each of the several views.

In the drawings:

FIG. 1 is a vertical sectional view through the instrument and associated parts, partly broken away to conserve space.

FIG. 2 is a partially schematic transverse sectional view through the structure of FIG. 1 in reduced scale.

FIG. 3 is a schematic wiring diagram of the instrument and associated mechanism.

Instrument 11 comprises a tubular casing 12 preferably vertically disposed and having a horizontally projecting fitting 13 terminating in a ball 14 held adjustably by means of an adjustable holding fixture so that the casing 12 is substantially vertical as indicated by level 15.

Casing 12 is cylindrical for a major part of its length and has an outwardly turned flange 17 received in an annular retaining ring 18. Above ring 18 is a disc-like cover 19 which seals against flange 17 by means of O-ring 21 and is held tight against ring 18 by means of bolts 22 and wing nuts 23. By removing nuts 23 and thence cover 19, access is obtained to the interior of casing 12. Extending from the bottom of casing 12 is an elongated tubular lower casing 26 of lesser diameter than upper casing 12 and closed at its bottom with an end piece 27 provided with a drain valve 28 to permit drainage of casing 12 and 26.

Inside casing 12 is a hollow hydrometer bulb 31 customarily made of nonmagnetic stainless steel and/or Teflon totally submerged in the liquid with which the casing is filled as hereinafter explained. Guide rings 32 which may be of Teflon or similar material limit lateral movement of bulb 31 but permit vertical movement thereof relative to casing 12 with negligible friction. The lower end of bulb 31 is provided with an extending tube 33 threaded at its lower end and receiving stem 34 which fits up inside of tube 33. A plurality of unit-weights 36 may be attached to the lower end of stem 34 by means of stud 37, said unit-weights being received inside lower casing 26. The unit-weights 36 may be interchanged depending upon the range of density of the liquid being monitored. This operation is performed merely by lifting the bulb 31 through the opening at top of casing 12 to obtain access to the weights 36. Stem 34 carries on its exterior two armatures 38, 39 which are vertically spaced apart. Armature 38 is a differential transformer armature while armature 39 is an electromagnetic armature, all as hereinafter described in detail.

Surrounding lower casing 26 is a transformer casing 41 which contains an upper or a differential transformer 42 and an electromagnetic coil 43. When the bulb 31 is in its midposition with respect to casing 12, differential transformer armature 38 is electrically centered relative to differential transformer 32 and electromagnetic coil armature 39 is located in a position such as to be responsive to the electromagnetic field of magnetic coil 43.

Fluid enters the instrument through a fitting 46 and the instrument continuously samples liquid flowing through a pipe constructed with a venturi as shown in patent application Ser. No. 471,136, or by other means drawing at least a portion of the liquid out of the conduit. A metering valve 47 is provided in conduit 46 controlled by a knob 48 to admit to the instrument 11 an amount of liquid suitable to provide a continuous sample in casing 12. Above valve 47 is a flow indicator 49 of a type which is commercially available, such as a Schutte & Koerting Flowrator Series 2700. The flow meter 49 has a downwardly tapered tube 51 receiving a ball 52. The flow of liquid upwardly through tube 51 balances the weight of ball 52 and the ball assumes a position proportional to flow. In accordance with the present invention, a fitting 53 is attached to the upper end of the flow meter 49 and connected to a curved horizontal pipe 54 which extends to inlet port member 56. Interposed in pipe 54 is an enlargement 57 which receives internally thermally sensitive resistor 58 which senses the temperature of the fluid. It will be understood that the density of fluid is dependent upon temperature and that for accurate density control there must be temperature compensation. The resistor 58 functions for that purpose as hereinafter explained.

Inlet port 56 comprises a blister on the exterior of casing 12 and is located substantially midway of the length of casing 12 on one side thereof. The casing 12 is formed with an elongated vertical slit aperture 61 in registry with port blister 56. Diametrically opposite port blister 56 is a vertically elongated intermediate port blister 62. Casing 12 is formed with a second aperture 63 diametrically opposite aperture 61. Casing 12 is also formed with upper and lower apertures 64, 66, respectively, communicating with intermediate port blister 62 on opposite sides of the guides 32. Thus, flow entering blister 56 passes through aperture 61 around bulb 31 out through aperture 63 into intermediate blister 62 where it divides and flows upwardly and downwardly and thence out into casing 12 through apertures 64 and 66. A discharge port blister 67 is formed approximately in registry with blister 56, and casing 12 is formed with upper and lower apertures 68, 69, respectively, which conduct flow of the liquid back from the casing 12 into the discharge port blister 67 and thence out through fitting 68 and back to the conduit from which the liquid was initially removed. The flow of liquid through the casing 12 is substantially horizontal and designed to balance out all vertical components acting upon bulb 31 so that the force of the flow of the liquid does not affect the vertical position of the bulb 31. It will be seen that the guides 32 serve a dual function, namely, to guide the bulb 31 to maintain it in vertical alignment and also to serve as seals to channel the circulation of the flow from the intake blister to the intermediate blister and back to the discharge blisters.

Turning now to schematic wiring diagram in FIG. 3, it will be seen that the position of bulb 31 within casing 12 causes variation in the position of differential transformer armature 38 relative to differential transformer coil 42, and this results in a variation in the output of transformer 42 which is amplified by means of an amplifier 71. The output of amplifier 71 controls a servomotor 72 which is mechanically connected to the sliding contact 73 of a potentiometer 74 across which a direct current potential is imposed. In series are the thermally sensitive resistor 58 and a fixed resistor 76 together with the coil 43 of the electromagnet which controls the position of electromagnetic armature 39 which is also movable with bulb 31. The effect of the control system is that armature 39 tends to be maintained in a constant position relative to coil 43 and this is accomplished by increasing or decreasing the flow of current through coil 43. Means is also provided to measure the current through coil 43 and for such purpose there is a recorder 77 in parallel with resistors 58 and 76 with a manually adjustable "span" potentiometer 78 interposed. Further, a controller 79 may be placed in parallel with recorder 77. Controller 79 controls flow through valve 81. It will be understood that the liquid being sampled through conduit 46 may be a mixture of several liquids. The specific gravity of the mixture is dependent upon the relative proportion of the ingredient liquids and if one of these liquids is controlled, then the density is affected. This is indicated schematically by valve 81.

In use, liquid is continuously admitted from the conduit through flow indicator 49 and then enters casing 12 and is discharged therefrom in the manner previously set forth. The magnitude of the current required in electromagnetic coil 43 to maintain the buoyancy-magnetic force relationship is determined by the density of liquid in the casing. Any variation from middle position excites transformer 42 and causes servomotor 72 to adjust potentiometer 74. Temperature of the fluid affects the resistance of resistor 58. The necessary current through coil 43 to bring bulb 31 to middle position is a function of density. Such current may be recorded by recorder 77 and also may control controller 79 to adjust valve 81 to restore the density to a preselected value. The combination of these events permits continuous blending of liquids to a controlled value of specific gravity.

Although the foregoing invention has been described in some detail, by way of illustration and example for purposes of clarity and understanding, it is understood that certain changes and modifications may be practiced within the spirit of the invention and scope of the appended claims.

What is claimed is:

1. A density sensing instrument comprising an elongated closed casing for liquid, liquid inlet and outlet means for said casing, means for continuously circulating liquid through said inlet, said casing and said outlet to maintain said casing substantially full of liquid, a bulb movable in and totally submerged in said casing, means for moving said bulb in said casing to a null point, and means external to said casing for sensing said last mentioned means to indicate density of liquid in said casing, said casing being perforated in a plurality of apertures, said casing being formed with a plurality of port-forming means each in registry with at least one said aperture, one said port-forming means connected to said liquid inlet means, another said port-forming means connected to said liquid outlet means, said apertures and said port-forming means arranged to balance out components of flow of liquid through said casing tending to bias said bulb longitudinally of said casing.

2. An instrument according to claim 1, in which said means for moving said bulb comprises electromagnetic means associated with said bulb.

3. An instrument according to claim 1, in which said means for sensing comprises a differential transformer sensitive to movement of said bulb relative to said casing.

4. An instrument of the character described comprising an elongated closed casing for liquid, a totally submerged hydrometer bulb supported by said liquid movable longitudinally in said casing, a first armature fixed for movement with said bulb, a differential transformer excited by the position of said first armature, a servomotor energized by said transformer, a second armature movable with said bulb, an electromagnetic coil influencing the position of said second armature, an electric circuit comprising a source of current, said coil, and variable means for varying flow of current through said circuit, said servomotor controlling said variable means to adjust the position of said second armature relative to said coil to electrically center said first armature in said transformer, means for measuring current through said circuit to indicate density of said liquid, said casing being perforated in a plurality of apertures, and a plurality of port-forming means external to said casing, each in registry with at least one said aperture, one said port-forming means connected to a liquid inlet, another said port-forming means connected to a liquid outlet, said apertures in said port-forming means arranged to balance out components of flow of liquid through said casing tending to bias said bulb vertically of said casing.

5. An instrument according to claim 4, which further comprises a recorder of density of said liquid recording current through said circuit.

6. An instrument according to claim 4, which further comprises a regulator energized by amplitude of flow through said circuit, a valve, and means adjusting said valve from said regulator.

7. An instrument according to claim 4, in which said circuit further comprises a thermally sensitive resistor arranged in shunt relation to said coil, said resistor placed in thermally conductive relationship to liquid in said casing.

8. An instrument according to claim 4, in which said casing is formed with a vertical liquid-tight extension, said bulb formed with a stem within said extension, said armatures spaced along said stem, said transformer and said coil correspondingly spaced on said extension.

9. An instrument according to claim 8, which further comprises interchangeable unit-weights on said stem and within said extension.

10. An instrument according to claim 8, in which said casing is provided at one end with a removable liquid-tight lid, said bulb and stem being removable from said casing and said extension when said lid is removed.

References Cited
UNITED STATES PATENTS

| | | | |
|---|---|---|---|
| 174,240 | 2/1876 | Hicks | 73—448 |
| 2,273,850 | 2/1942 | Ewald | 73—452 |
| 2,434,425 | 1/1948 | Muller | 73—309 |
| 3,040,585 | 6/1962 | Chatel. | |

RICHARD C. QUEISSER, *Primary Examiner.*

G. I. McCLELLAND, *Assistant Examiner.*